United States Patent [19]

Simshauser et al.

[11] 4,287,587
[45] Sep. 1, 1981

[54] SIGNAL LOSS DECTECTOR FOR VIDEO DISC

[75] Inventors: Elvin D. Simshauser, Columbus; Richard W. Nosker, Princeton, both of N.J.

[73] Assignee: RCA Corporation, New York, N.Y.

[21] Appl. No.: 128,235

[22] Filed: Mar. 7, 1980

[51] Int. Cl.³ .............................................. G11B 3/58
[52] U.S. Cl. .................................... 369/50; 328/149; 369/71; 369/72; 369/126
[58] Field of Search ................ 358/127, 128.5, 128.6; 179/100.1 G, 100.4 D, 100.3 V, 100.4 R, 100.4 A; 360/38; 307/350, 351, 354, 362, 231, 358; 328/146, 149; 274/47

[56] References Cited

U.S. PATENT DOCUMENTS

| | | | |
|---|---|---|---|
| 3,711,641 | 1/1973 | Palmer | 178/6.6 TC |
| 3,864,733 | 2/1975 | Boltz, Jr. | 360/38 |
| 3,909,518 | 9/1975 | Baker | 360/38 |
| 4,001,496 | 1/1977 | Clemens et al. | 358/127 |
| 4,038,686 | 7/1977 | Baker | 358/127 |
| 4,080,625 | 3/1978 | Kawamoto et al. | 179/100.1 G |
| 4,119,812 | 10/1978 | Fox | 360/38 X |

OTHER PUBLICATIONS

"Mark/space demodulator employs active filters", M. J. Gordon, Jr., *Electronics,* Jul. 19, 1973, p. 116.
"Linear Application Handbook", National Semiconductor Corp., Santa Clara, CA, 1978, pp. AN48-8 to 11.
"Capacitive Pickup and the Buried Subcarrier Encoding System for the RCA Videodisc", J. K. Clemens, RCA Review, vol. 39, Mar. 1978.

*Primary Examiner*—Bernard Konick
*Assistant Examiner*—Donald McElheny, Jr.
*Attorney, Agent, or Firm*—E. M. Whitacre; J. S. Tripoli; E. P. Herrmann

[57] ABSTRACT

A video disc playback system includes a circuit for detecting degradation in signals recovered from a disc and generates a control pulse responsive to the detected degradation. The degradations are of a predetermined duration and represent a predetermined percentage decrease in amplitude. A peak detecting and following circuit is connected for receiving signals recovered from the disc record. The decay rate of the peak detecting circuit is arranged to be substantially equal to a certain minimum duration of amplitude degradations that should occur before it is desired to generate the control pulse. The output signal from the detector circuit is proportioned by a divider circuit and then integrated to produce a signal which is proportional to the average of the detected signal over a relatively long period of time. The proportioned signal is applied to the reference signal terminal of a comparator circuit and the detected signal is applied to the signal input terminal of the comparator. The comparator is conditioned to change states when the detected signal falls below the proportioned signal.

7 Claims, 5 Drawing Figures

SIGNAL LOSS DECTECTOR FOR VIDEO DISC

The present invention relates to video disc playback systems and in particular to circuitry for detecting degradation of signals recovered from the disc record.

Certain video disc systems employ disc records on which information is prerecorded in the form of geometric variations along a signal track. The information is recovered from the disc by a signal pickup stylus arranged to engage the disc record. The signal pickup stylus and the geometric variations on the disc record cooperate when relative motion is created therebetween to produce a recovered signal in accordance with the prerecorded information. In the pressure-sensitive signal pickup type systems the stylus tip is constrained to follow the geometric variations per se, the motion induced in the stylus being translated to an electromechanical transducer which produces an electric signal relative to the motion induced in the stylus. In the capacitive type signal pickup systems the geometric variations and the stylus tip form a temporally varying capacitance therebetween, which capacitance variations modulate the resonant frequency of a resonant circuit to modulate the amplitude of a constant frequency signal applied thereto, the amplitude modulation representing the signal recovered from the disc.

The signal pickup stylus of either of these types of systems is subject to picking up or accumulating foreign material as it traverses the signal track on the disc. The foreign material may be dust, moisture, residue from manufacturing the disc or material abraded from the disc by repeated play, etc. The accumulated material is believed to be one factor having a deleterious affect on stylus performance, i.e., in the pressure-sensitive systems it effectively increases the area of the stylus tip reducing both its frequency and amplitude response to the track geometry while in the capacitive systems it tends to increase the effective stylus-disc separation decreasing the capacitance therebetween and subsequently the amplitude of the recovered signal. It is desirable to remove the accumulated material without significant interruption of play. One means of accomplishing such removal is to cause the stylus to skip radially across several tracks forward and aft of its present play position. The skipping action creates rapid momentum changes in the stylus which tends to jerk or throw the foreign material from the stylus. In addition, the "landing" of the stylus back onto the disc after a flight across several tracks generates an abrading condition between stylus and disc which tends to clear or remove such material.

In accordance with the present invention a circuit is disclosed for generating a control signal to trigger a means for clearing the stylus of foreign material on the occurrence of a degradation of signal amplitude by a predetermined percentage and lasting for at least a predetermined duration. The disclosed circuit includes a peak detecting circuit connected for receiving the signal recovered from the disc. The signal decay rate of the peak detecting circuit is designed to be substantially equal to a certain minimum duration of an amplitude degradation that should occur before it is desirable to initiate activation of stylus clearing. A divider circuit is connected to the output signal of the peak detector for proportioning the detected signal. The time constant or decay rate of the proportioned signal is arranged to be long compared to the decay rate of the detected signal. The proportioned signal is applied to the reference input terminal of a comparator circuit and the signal from the output of the peak detector is applied to the signal input terminal of the comparator circuit. The comparator produces a control signal at its output whenever the peak detector output signal falls to a level below the signal level of the proportioned signal.

Figure 3:
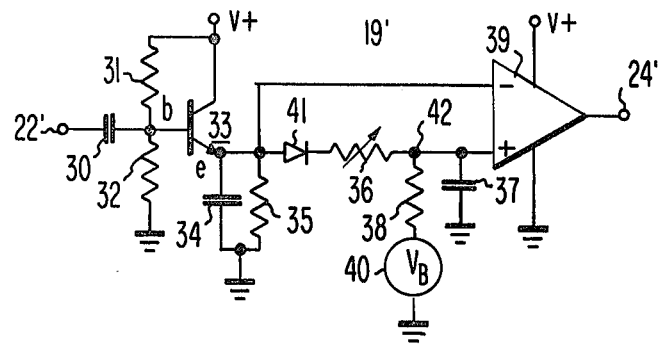
FIG. 3 is a specific circuit schematic diagram of a self-calibrated circuit for generating a control pulse responsive to a decrease in input signal level.
Figure 4:
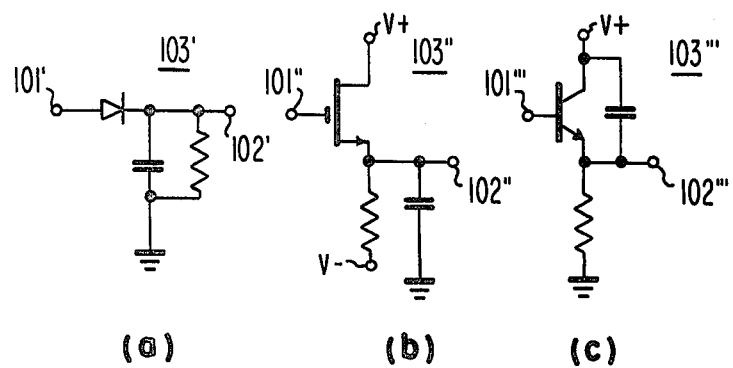
Figure 5:
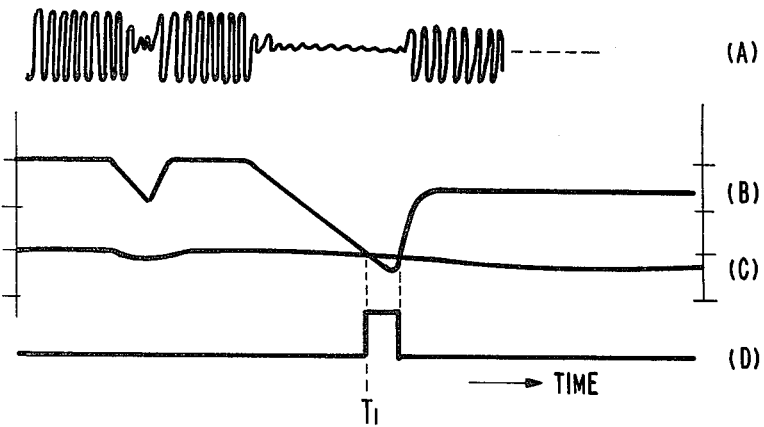

FIGS. 4 (*a*), (*b*), and (*c*) are three variations of amplitude peak detection circuits; and FIG. 5 is a time-amplitude graph of signal amplitude at several nodes in the FIG. 3 circuit.

Figure 1:
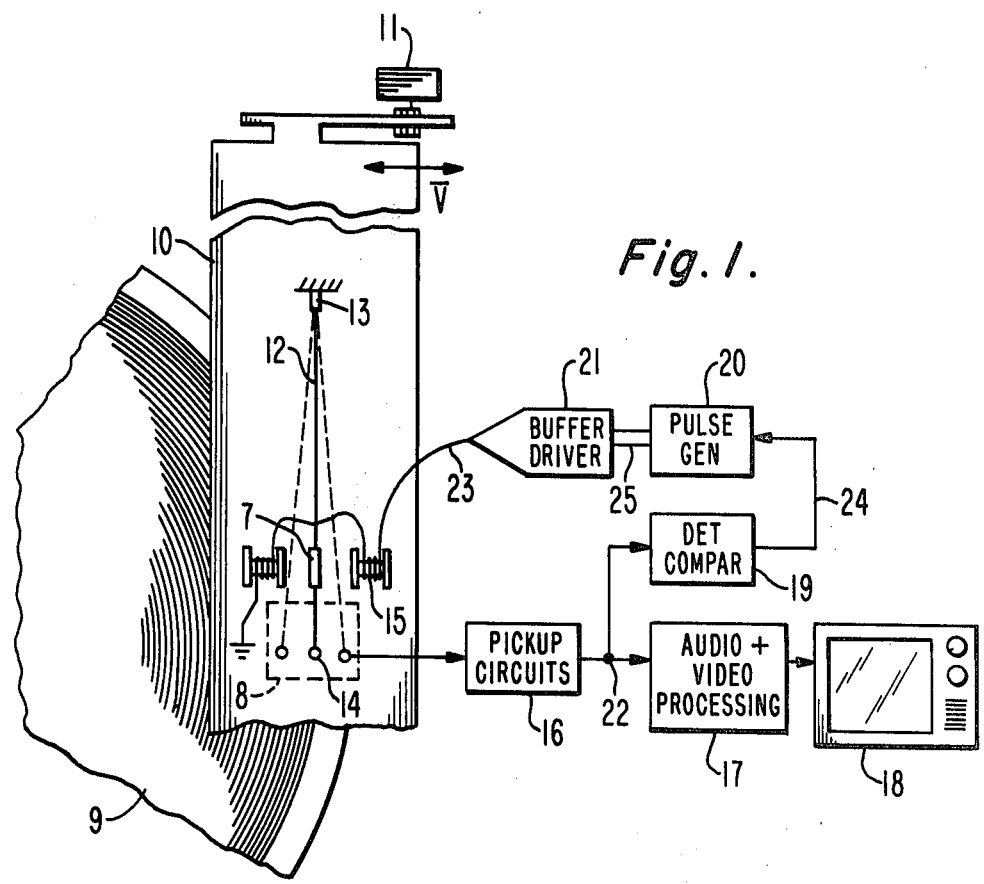
FIG. 1 is a partial schematic partial block diagram of a video disc player incorporating means for clearing the signal pickup stylus of foreign material.

FIG. 1 shows schematically a portion of a video disc player including the signal recovery apparatus. In the figure a carriage assembly 10 supports and translates a signal pickup stylus 14 across a disc record 9. The pickup stylus 14 engages the disc record through aperture 8 in the carriage, and the carriage is translated by motive means 11. The pickup stylus 14 is mounted to the free end of a rigid stylus arm 12, the second end thereof being secured to the carriage by the compliant coupler 13. The coupler 13 permits relatively free movement of the pickup stylus at least in the directions of the carriage velocity designated V in the figure.

A transducer for inducing motion to the stylus relative to the carriage and the disc record is included in the carriage assembly. The transducer is exemplified in FIG. 1 by a pair of coils 15 secured to the carriage assembly on either side of the stylus arm. A magnetic element 7 is secured to the stylus arm and disposed between the coils 15. Energization of the coils by a current provided on line 23 generates a magnetic flux in the area between the coils sufficient to move the element 7 and thereby deflect the stylus arm 12 and stylus 14 to which it is secured. The direction of the stylus deflection is determined by the polarity of the applied energization current.

The pickup stylus 14 cooperates with the disc record 9 and signal pickup circuitry 16 to recover the prerecorded information on the disc. For an example of the capacitive type video disc systems, see J. K. Clemens', "Capacitive Pickup and the Buried Encoding System for the RCA Video Disc", RCA Review Vol. 39, No. 1, March 1978, pp. 33–59 and U.S. Pat. No. 4,080,625 entitled, "Pickup Circuitry for a Video Disc Player with Printed Circuit Board" issued Mar. 21, 1978 to H. Kawamoto et al and assigned to RCA Corporation. The recovered signals available from the pickup circuitry 16 at connection 22 are conditioned by the audio and video processing circuitry 17 for application to the antenna input terminals of a typical television receiver 18.

The signal available at connection 22 may be amplitude modulated or phase or frequency modulated depending on the particular system. For descriptive purposes a capacitive disc system will be assumed and the signal at connection 22 will be presumed to be frequency modulated or FM, having a nominal constant amplitude. Buildup of foreign material on the pickup stylus tends to decrease the absolute disc-stylus capacitance reducing temporal disc-stylus capacitance variations representing the recorded information. This reduction in temporal capacitance variations is manifested by a reduction in the amplitude and the quality of the FM signal.

The signal at connection 22 is applied to circuitry 19 where it is detected, for example, by a peak detector and then compared against a reference potential. When the detected signal falls below the predetermined reference, which is set at some percentage of the nominal detected amplitude, the output signal from circuitry 19 exhibits a transition for controlling or triggering circuitry 20. Circuitry 20, in response to a trigger pulse on line 24, generates a predetermined sequence of pulses to cause alternate deflections of the stylus 14 by the deflection transducer. The output pulse sequence from pulse generator 20 is applied to the buffer/driver 21 which buffers and/or conditions the waveform to drive the particular deflection transducer.

Figure 2:
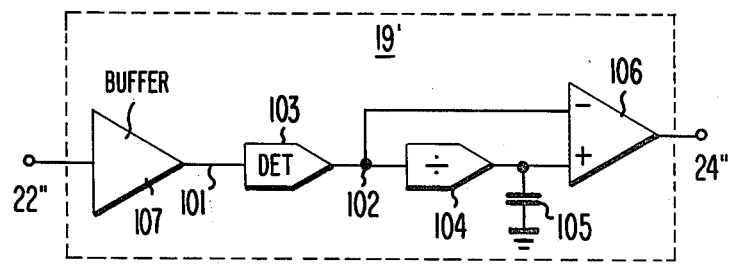
FIG. 2 is a block diagram of a detection and control pulse generating circuit embodying the present invention.

The FIG. 2 circuit depicts in block form a circuit embodying the present invention which generates a control pulse responsive to a percentage decrease in input signal remaining for at least a particular duration. In at least the capacitive type video disc systems it has been recognized that differing disc-stylus combinations produce recovered signals having nominal amplitudes varying from combination to combination by as much as 10:1. Therefore, in order to arrange a system for generating a trigger pulse responsive to a signal amplitude decrease, the system must be self calibrating to the nominal amplitude of each record-stylus combination. This is accomplished in the FIG. 2 circuit by peak detecting the recovered signal to obtain a signal representing the current or recently recovered signal amplitude, then proportioning and integrating this signal to obtain a signal which is proportional to the instantaneous detected signal averaged over a relatively long time period, 5 seconds for example. This latter signal is a slowly varying DC signal referenced to the input signal amplitude and a predetermined percentage of it. It can be compared with the current or real time detected signal to indicate when the amplitude of the detected signal has decreased to less than that percentage of its nominal value.

In FIG. 2 the signal recovered from the disc record is applied to terminal 22". This signal is buffered and/or amplified by amplifier 107 and then applied to detector 103. Detector 103 peak detects the amplified signal, creating a generally DC or slowly varying signal at its output connection 102 representative of the amplitude of the AC signal applied to its input on line 101. This DC signal is applied to one input terminal of comparator 106 and is also applied to the signal divider circuit 104 which applies a percentage of the DC signal at connection 102 to the reference terminal of comparator 106. Capacitor 105 connected to the reference terminal of the comparator causes an integration of the proportioned signal precluding any abrupt signal changes thereat and effectively averaging the proportional signal over a relatively long time period.

In a steady state condition, i.e., the input signal being at a relatively constant amplitude, the reference terminal of the comparator is more negative than the signal terminal and the output terminal 24" of the comparator is in a "low" state. If, however, the input signal amplitude to the detector 103 decreases allowing the signal at connection 102 to decay to a level below the reference level, the comparator will switch and its output signal will exhibit a "high" state, returning to a "low" state when the signal at connection 102 is again greater than the reference. The decay rate, that is, the minimum time it takes for the signal at connection 102 to decay to the reference signal level defines the minimum time that a decrease in signal amplitude must be present in order to generate a control or trigger signal at output terminal 24".

The FIG. 3 circuit is a particularized version of the FIG. 2 system. In the figure, the transistor 33, resistor 35 and capacitor 34 perform the peak detection. Transistor 33 is connected as an emitter follower. Application of signal potential to the base electrode of transistor 33 is translated to its emitter electrode less a base-emitter forward potential drop. Resistors 31 and 32 bias the base electrode of transistor 33 to some value such that AC signal appearing at the input terminal 22' will influence the transistor 33 emitter current. Capacitor 30 serves to isolate terminal 22' from the DC potential at the base electrode and to couple an AC signal from terminal 22' to the transistor base electrode. Consider the circuit to be in the steady state, i.e., a nominally constant amplitude FM signal being applied to input terminal 22'. The positive peaks of the FM signal forward bias the base-emitter junction of transistor 33 to charge capacitor 34. Negative swings of the FM signal reverse bias the base-emitter junction turning transistor 33 off. On every negative half cycle of the FM signal the charge on the capacitor 34 begins to leak off or discharge through resistor 35 and the potential at the emitter decays with a time constant determined by R35 and C34, the resistance and capacitance values of 35 and 34 respectively. The resistance of resistor 36 is large compared to the resistance of resistor 35, hence current flow through resistor 36 is not significant. The time constant R35 C34 is made long compared to the cycle time of the input FM signal so that only a small percentage of the charge leaks off the capacitor for each negative half cycle of the input signal, and the potential at the emitter electrode approximately follows the peak level of the input signal.

If the amplitude of the input signal decreases by an amount greater than the potential decay on the capacitor associated with a negative half cycle, subsequent signal peaks will be insufficient to forward bias the base-emitter junction of transistor 33, and the capacitor 34 will continue to discharge until the potential at the emitter drops to a level that is one base-emitter potential drop below the peak input signal, and the potential at the emitter will stabilize at this level. The potential at the emitter electrode can readily follow increases in the amplitude of the input signal but is constrained to follow decreases at a rate established by the R35 C34 time constant.

The resistors 36 and 38 form a voltage divider to divide down the voltage at the emitter by R38/(R38+R36), where R38 and R36 are the resistance values of resistors 38 and 36 respectively. Diode 41 is connected serially with resistor 36 to prevent discharge of capacitor 37 through this path and bias potential 40 is included to offset the forward potential drop of diode 41 or impose further offsets as desired. The potential at connection 42 is proportional to the peak detected signal and is applied as a reference to the noninverting input terminal of differential amplifier 39. The capacitor 37-resistor 38 combination establishes the decay rate for negative potential changes at connection 42, which rate is long relative to the time constant at the emitter electrode of transistor 33. The potential at connection 42 is slow to respond to changes in potential at the emitter electrode and establishes the long term or nominal reference level in accordance with the input signal level of a particular stylus-disc combination.

The inverting input terminal of differential amplifier 39 is connected to the emitter electrode and therefore follows the current average peak signal applied to the input terminal 22'. Referring to FIG. 5, waveform (A) represents an FM signal which suffers from amplitude degradation and is presumed coupled via terminal 22' to the base of transistor 33. This signal is rectified or detected by the transistor base-emitter junction and appears at the emitter electrode as a slowly varying DC signal (waveform (B)), the amplitudes of waveforms (B) and (C) are shown exaggerated. The emitter potential cannot follow abrupt negative changes in the AC signal amplitude of short duration because of the R35 C34 time constant and therefore decays to the new, lesser peak amplitude. The potential decay at the emitter electrode, however, is much more rapid than the decay at connection 42 (waveform (C)) allowing the inverting input of amplifier 39 to become more negative than the non-inverting input of amplifier 39 (time T1) and causes the amplifier output potential at terminal 24' to swing from negative saturation to positive saturation (waveform (D)) thereby generating a control signal.

FIGS. 4 (a), (b) and (c) show several of the known variations on the basic detection circuit.

Though the present invention has been described in terms of a signal pickup stylus type video disc system it should be readily apparent that it is equally applicable to the detection of a percentage signal loss in optically scanned video disc systems, video tape playback systems, etc. since the invention operates on the signal after it has been recovered from the recording medium.

What is claimed is:

1. In a video disc player having apparatus for recovering prerecorded signals from a disc record, circuitry for generating a control signal responsive to degradation in the recovered signal comprising:

signal amplitude detector means having an input terminal connected for receiving said recovered signal, and having an output terminal, wherein the time constant at the output terminal thereof is long compared with cyclical changes of the recovered signal;

divider means connected to the output terminal of the detector means for proportioning the signal thereat, the rate of change of the proportioned signal being long compared to the rate of change of the detector means output signal;

comparator means having a first input terminal connected for receiving the proportioned signal and a second input terminal connected for receiving the detector means output signal, and having an output terminal for providing a control signal, said control signal from the comparator means being normally at a first output signal level but changing to a second level when the signal level at its second input terminal falls below the signal level at its first input terminal.

2. A video disc playback apparatus of the type including a playback stylus for engaging a disc record to recover prerecorded information, said playback apparatus including apparatus for detecting degradations in the recovered signal comprising:

means connected to and cooperating with the playback stylus for recovering the prerecorded information and for producing said recovered signal at an output terminal thereof;

signal amplitude detector means having an input and an output terminal, wherein output signal provided at the output terminal thereof rapidly increases in accordance with increases in input signal amplitude, and decreases at a slow rate compared to decreases in the input signal level;

means connecting the input terminal of the detector means to the output terminal of the means connected to the playback stylus;

signal divider means connected to the output terminal of the detector means for proportioning the output signal of the detector means, the proportioned signal following the signal at the input of the divider means at a rate that is long compared to the signal applied to said divider means;

comparator means having a first input terminal for receiving said proportioned signal and a second input terminal connected to the output terminal of the detector means, said comparator means producing a signal transition from a first to a second state at an output terminal thereof on the occurrence of the detector output signal decreasing below the level of the proportioned signal, thereby generating a control signal.

3. The apparatus set forth in claim 1 or 2 wherein the detector means comprises:

a rectifying pn junction having first and second terminals connected respectively to the input and output terminals of said detector means;

a capacitor connected between the output terminal of said detector means and a first point of fixed potential;

a resistor connected between the output terminal of said detector means and a second point of fixed potential, said resistor and capacitor effectuating a time constant which is long compared to cyclical changes of the signal applied to the input terminal of the detector means.

4. The apparatus set forth in claim 1 or 2 wherein the detector means comprises:

a transistor having first and second electrodes and a principal conduction path therebetween and having a control electrode, said principal conduction path being controlled by potential applied between said first and control electrodes;

means connecting the control and first electrodes respectively to the input and output terminals of the detector means;

means for applying supply potential to the second electrode of the transistor, poled to condition the transistor for normal operation;

bias means connected to the control electrode for conditioning the principal conduction path into conduction for a predetermined amplitude of AC signal applied to the input terminal of the detector means;

a capacitor connected between the output terminal of the detector means and a first point of fixed potential;

a resistor connected between the output terminal of the detector means and a second point of fixed potential, wherein the resistor and capacitor effectuate a time constant which is long compared to said AC input signal.

5. The apparatus as set forth in claim 3 wherein said first and second points of fixed potential are at a common potential.

6. The apparatus as set forth in claim 3 wherein the signal divider means comprises:
   first and second serially connected resistors, said first resistor further connected to the output terminal of the detector means and said second resistor further connected to said second point of fixed potential, and wherein the proportioned signal is available at a point of interconnection of said first and second resistors;
   a capacitor connected between a point of fixed potential and the interconnection of said first and second resistors, effectuating a time constant which is long compared to signal changes available at the output connection of the detector means.

7. A video disc playback apparatus of the type including a playback stylus for engaging a disc record to recover prerecorded information, said playback apparatus including apparatus for detecting a degradation in the recovered signal comprising:
   means connected to and cooperating with the playback stylus for recovering the prerecorded signal and producing said recovered signal at a first output terminal;
   a transistor having first and second electrodes and a principal conduction path therebetween, and having a control electrode, said principal conduction path being controlled by potential applied between said first and control electrodes;
   means connecting the control electrode of said transistor to said first output terminal;
   means for applying supply potential to the second electrode of the transistor, poled to condition the transistor for normal operation;
   bias means connected to the control electrode for conditioning the principal conduction path into conduction for a predetermined amplitude of AC signal applied to the input terminal of the detector means;
   a capacitor connected between the first electrode of said transistor and a first point of fixed potential;
   a resistor connected between the first electrode of said transistor and a second point of fixed potential, wherein the resistor and capacitor effectuate a time constant which is long compared to the cycle time of said AC input signal;
   first and second serially connected resistors, said first resistor further connected to the first electrode of said transistor and said second resistor further connected to said second point of fixed potential, wherein a signal proportional to the signal at said first electrode is available at a point of interconnection of said first and second resistors;
   a capacitor connected between one of said first and second points of fixed potential and the interconnection of said first and second resistors, effectuating a time constant which is long compared to signal changes available at said first electrode;
   comparator means having a first input for receiving said proportioned signal and a second input connected to said first electrode, said comparator means producing a signal transition from a first to a second state at an output terminal thereof on the occurrence of signal at said first electrode decreasing below the level of the proportioned signal, thereby generating a control signal.

* * * * *